United States Patent [19]

Davidson et al.

[11] Patent Number: 5,428,748

[45] Date of Patent: Jun. 27, 1995

[54] METHOD AND APPARATUS FOR AUTOMATICALLY CONFIGURING A COMPUTER PERIPHERAL

[75] Inventors: Andrew M. Davidson; John A. Stewart, both Glasgow; David Crosbie; Patrick Crinion, both of Erskine, all of England

[73] Assignee: National Semiconductor Corporation, Santa Clara, Calif.

[21] Appl. No.: 950,914

[22] Filed: Sep. 24, 1992

[51] Int. Cl.[6] .......................................... G06F 13/368
[52] U.S. Cl. ............................. 395/275; 364/DIG. 1; 364/DIG. 2; 364/238.3; 364/280.2; 364/284.2
[58] Field of Search ............... 395/275, 700, 275, 375, 395/500, 800; 364/DIG. 1 MS File, DIG. 2 MS File,

[56] References Cited

U.S. PATENT DOCUMENTS

| | | | |
|---|---|---|---|
| 4,373,181 | 2/1983 | Chisholm et al. | 395/400 |
| 4,688,172 | 8/1987 | Wright | 395/700 |
| 4,730,251 | 3/1988 | Aakre et al. | 395/325 |
| 4,750,136 | 7/1988 | Aprin et al. | 364/514 |
| 5,038,320 | 8/1991 | Heath et al. | 395/275 |
| 5,237,690 | 8/1993 | Bealkowski et al. | 395/700 |
| 5,274,771 | 12/1993 | Hamilton et al. | 395/275 |

Primary Examiner—Robert B. Harrell
Attorney, Agent, or Firm—Limbach & Limbach; H. Donald Nelson; Richard J. Roddy

[57] ABSTRACT

A host computer, coupled to a peripheral device by its system bus, identifies an available input/output address and designates that input/output address as being assigned to that peripheral device. After identification of the available input/output address, the host computer transmits a logic trigger signal in the form of a sequence of write commands that write the assigned input/output address, as well as other configuration parameters, to an infrequently used input/output address. In response to the logic trigger, the peripheral reads and stores the assigned input/output address and other configuration parameters from the host computer's data bus, The configuration parameters and the assigned input/output address are then written to an EEPROM for non-volatile storage. After this configuration is established, the peripheral device automatically retrieves the stores configuration parameters and assigned input/output address from the EEPROM every time the host computer is turned on or is otherwise reset.

13 Claims, 4 Drawing Sheets

| | D15 | D0 | |
|---|---|---|---|
| 0FH | Not Used | Config C | 68 |
| 0EH | Config B | Config A | 64 |
| 66 | ⋮ | ⋮ | |
| 08H | 42H | 42H | |
| 07H | 57H | 57H | |
| | ⋮ | ⋮ | |
| 03H | Checksum | Board Type | |
| 02H | E'net Address 5 | E'net Address 4 | |
| 01H | E'net Address 3 | E'net Address 2 | |
| 00H | E'net Address 1 | E'net Address 0 | |

METHOD AND APPARATUS FOR AUTOMATICALLY CONFIGURING A COMPUTER PERIPHERAL

This invention relates generally to the interaction between a computer and a peripheral device. More particularly, this invention describes a method and apparatus for automatically configuring a peripheral device with a host computer so that a user is not required to identify and set an input/output address for the peripheral.

BACKGROUND OF THE INVENTION

A computer is operated by a microprocessor which is a complex logic element that performs arithmetic, logic, and control operations. The microprocessor accesses and interacts with peripheral devices such as keyboards, monitors, printers, and file servers through a common external bus. Peripheral devices typically include a microcontroller or other logic element that is used to interface with the microprocessor of the host computer. The peripheral device's microcontroller handles data transfers between the host computer and the peripheral device as well as data processing tasks performed by the peripheral device.

A host computer typically has a set of predefined input/output (I/O) addresses assigned to commonly used peripheral devices, such as keyboards, monitors and printers, as well as a set of additional I/O addresses that can be assigned to other peripheral devices. The predefined I/0 addresses for commonly used peripheral devices are built into the host computer's hardware at the time of manufacture, and are also stored in the computer's operating system software.

Thus, peripheral devices which do not have an associated predefined I/O address must be assigned one of the additional I/O addresses. In addition, some peripheral devices, such as peripheral devices that can send data to the host computer, typically must be assigned an interrupt code, used to notify the host computer's microcontroller that the peripheral device needs to be "serviced".

It is a basic requirement in such computer systems that no two peripheral devices may be assigned the same I/O address, because that would cause the operation of the two peripheral devices to interfere with each other. Assigning two peripheral devices the same I/O address prevents effective communication between the host computer and either peripheral device, and often will cause the entire computer system to stop working.

Traditionally, so-called "add-on peripheral devices" include one or more jumpers or DIP switches that are used to set that device's I/O address and interrupt code. Additional jumpers or DIP switches are sometimes used to set other configuration parameters of a peripheral device, thereby determining the other operating characteristics of the peripheral device. Clearly, as the number of configuration parameters set by jumpers of DIP switches increases, the potential for error and improper configuration of the peripheral device increases.

Unfortunately, when jumpers or DIP switches are used to establish an I/O address for a peripheral device, the person installing the peripheral device must have knowledge of what I/O addresses and interrupt codes are available in the host computer and that person must physically manipulate one or more components on the peripheral device's circuit board, at the risk of damaging the peripheral device.

Furthermore, in order to know what I/O addresses and interrupt codes are available in the host computer, the person installing the peripheral device is required to have knowledge of the I/O addresses and interrupt codes assigned to all other peripheral devices connected to the host computer. That, in turn, may require that all those other peripheral devices be temporarily disconnected from the computer to allow inspection of their jumper settings, and may well require the installer to study the installation manuals of all those other peripheral devices to determine what I/O address and interrupt code are associated with those jumper settings. Clearly, this can be a tedious and error prone process, and one which is beyond the technical capabilities of many unsophisticated computer users.

To overcome the above noted problems, peripheral vendors have built devices which can be automatically configured by software. Typically, configuration software running on the host computer downloads configuration parameter values into registers in the peripheral device. The configuration parameters loaded into the peripheral device may include not only an I/O address, but also other parameters that determine the peripheral device's mode of operation.

A major shortcoming of the software configurable peripheral devices is that the peripheral device must be given an initial or default I/O address to be used prior to the downloading of configuration parameters into the peripheral device. The reason for this is that in order for the host computer to communicate with the peripheral device, it must be able to send and/or receive data at some established address. In prior art systems, the initial or default I/O address is established without knowledge of whether that address is available in a particular host computer. If the peripheral is configured at an I/O address which is already used by another peripheral, the host computer and the peripheral may not operate correctly.

OBJECTS AND SUMMARY OF THE INVENTION

It is a general object of the present invention to provide a method and apparatus for automatically configuring a peripheral device through the use of software executed on a host computer.

It is a related object of the present invention to provide a method and apparatus for identifying and assigning an unused I/O address to a peripheral device.

It is another object of the invention to configure a peripheral device by providing the peripheral device with an EEPROM into which configuration information is downloaded by a host computer.

It is a related object of the invention to provide the peripheral device with a lower power consumption serial EEPROM, and a serial/parallel interface between the serial EEPROM and the peripheral device's microcontroller.

It is another object of the invention to provide a peripheral device apparatus for detecting the resetting of a host computer, and to responsively download configuration information from an EEPROM into the peripheral device's configuration registers.

It is another object of the invention to provide a method and apparatus for automatic configuration of a computer peripheral which can be superseded using traditional switches or jumpers.

In summary, the present invention includes a host computer and a configurable peripheral device coupled to the host computer, where the host computer is programmed to automatically identify an available I/O address not used by any other peripheral devices coupled to the host computer. Prior to configuration of the peripheral device, the peripheral device has no assigned I/O address.

After identification of an available I/O address, the host computer downloads the identified I/O address into the configurable peripheral device by transmitting a logic trigger, in the form of a sequence of signals directed at an infrequently used I/O address, along with configuration parameters for the identified I/O address.

In response to the logic trigger, the peripheral device reads and stores the transmitted configuration parameters transmitted by the host computer's data bus in a configuration register. Once the identified I/O address has been stored in a configuration register in the peripheral device, the peripheral devices can thereafter be accessed by the host computer using commands directed at that I/O address or at an associated range of I/O addresses. For instance, other configuration parameters could be written by the host into the peripheral device's configuration registers.

The received configuration parameters, including the assigned I/O address, are then written by the peripheral device's microcontroller into an EEPROM for non-volatile storage. After the configuration parameters are stored in the EEPROM, the peripheral device thereafter automatically loads the I/O address and other configuration parameters from the EEPROM into its configuration registers every time the host computer is turned on or otherwise reset.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE PREFERRED EMBODIMENTS

Figure 1:
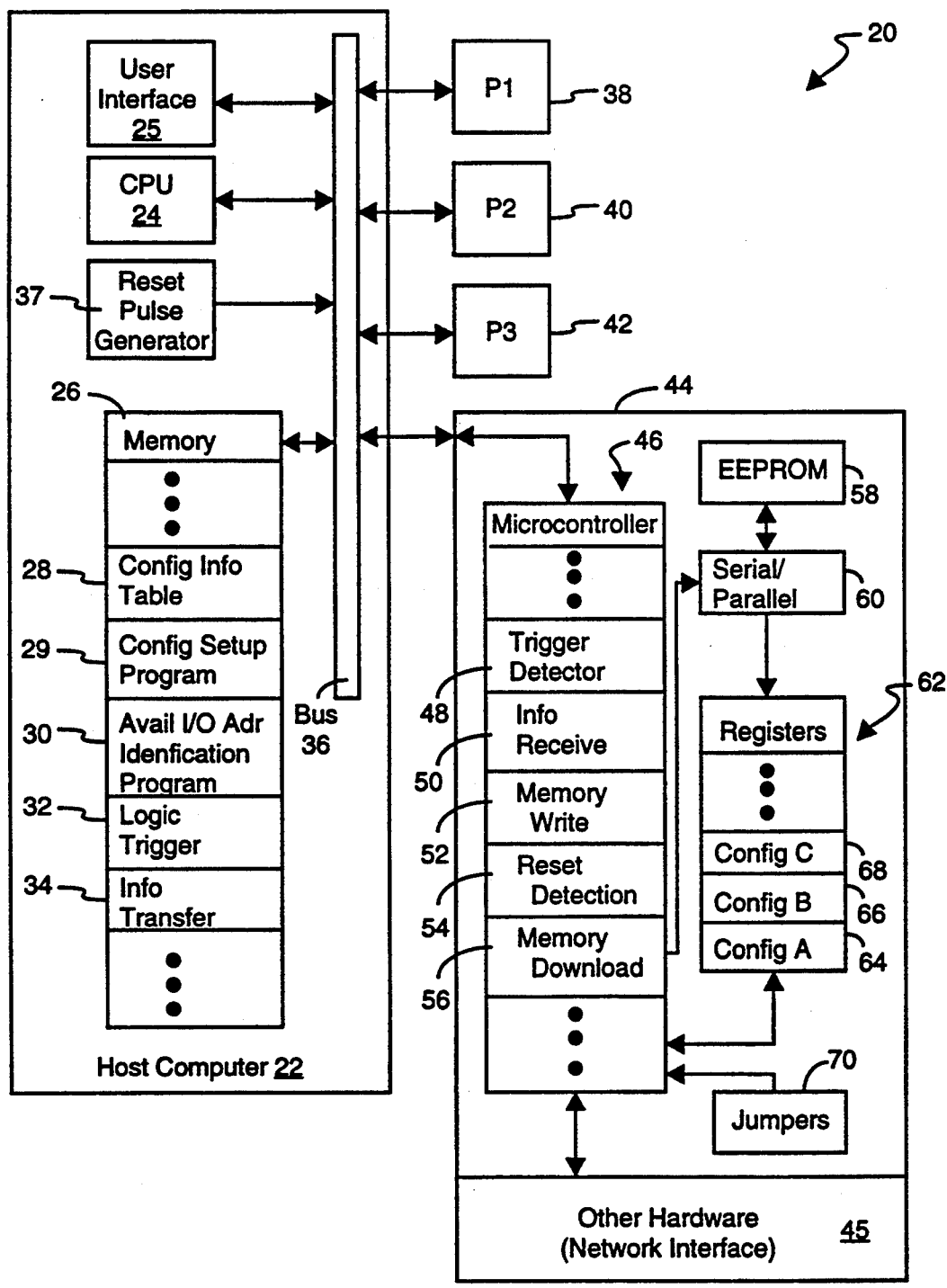
FIG. 1 depicts an apparatus, in accordance with the invention, for automatically configuring a computer peripheral.

Referring to FIG. 1, an apparatus 20 for automatically configuring a computer peripheral is disclosed. The apparatus 20 includes a host computer 22 which includes a central processing unit (CPU) 24, a user interface 25 for interacting with users of the system 20, and memory 26 for the storage of data and software. In one preferred embodiment the host's CPU 24 is from the Intel 80×86 family, but the invention is equally applicable to any other type of processor. The memory 26 may be any suitable combination of RAM, ROM, and disc memory. The memory 26 stores configuration software used for configuring a peripheral device 44. The configuration software includes a table of configuration information 28, a configuration setup program 29, a subroutine 30 for identifying an available I/O address, a logic trigger program 32, and a configuration information transfer program 34.

Figure 2:
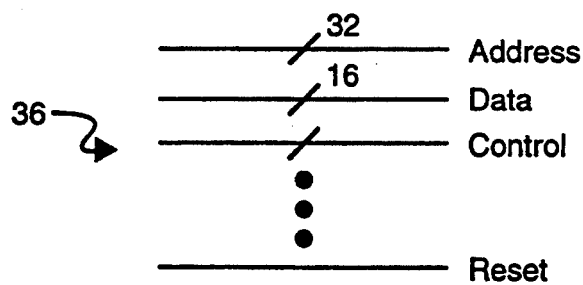
FIG. 2 is a simplified view of a data bus which may be used in accordance with the invention.

The host computer 22 also includes a main system bus 36 through which the CPU 24 interacts with a number of peripheral devices 38, 40, 42, and 44. FIG. 2 depicts those portions of the system bus 36 used in accordance with the invention. The bus 36 includes a number of address, data, and control lines. The bus also includes a reset line upon which a pulse signal is generated by the host computer's reset pulse generator 37 whenever the host computer is powering up or is reset.

Peripheral device 44 is a peripheral which utilizes the methodology and apparatus of the present invention. The peripheral 44 includes hardware 45 for performing a particular task, such as interfacing with an Ethernet Local Area Network, as well as a microcontroller 46 and other circuitry that enable the microcontroller 46 to perform certain digital data processing functions.

Interaction between host computer 22 and peripheral device 44 is governed, on behalf of the peripheral device, by microcontroller 46. Microcontroller 46 may be any type of programmable or hardwired logic circuit. The microcontroller 46 of the invention includes a number of stored programs, including programs (48, 50, 52, 54 and 56) for configuration of the peripheral device, as well as programs (not shown) for performing the primary tasks of the peripheral device, which in this example are the tasks associated with transmitting between an Ethernet network and the host computer. The microcontroller's configuration programs include a logic trigger detector 48, an information reception module 50, a memory write module 52, a reset detection module 54, and a memory download module 56. The operation of these programs will be described in more detail below.

The peripheral device 44 also includes an EEPROM 58 for storing I/O address information and other configuration information. In the preferred embodiment, the EEPROM 58 is a very low power consumption "serial EEPROM" device, such as the NM93C06 made by National Semiconductor, Santa Clara, Calif. In the preferred embodiment, the serial EEPROM 58 has a storage capacity of just thirty-two bytes, providing the non-volatile memory needed to retain the peripheral device's configuration information (which occupies three bytes in the preferred embodiment) and its Ethernet network address (which occupies six bytes, plus a one-byte checksum). While such serial EEPROM devices have relatively slow access times, because data is transferred into and out of the device over a serial port one bit at a time, the EEPROM 58 is typically accessed only when the host computer 22 is powered up or reset, and therefore speed of access to the EEPROM is not important.

Traditionally, Ethernet communication boards and other network communication peripheral devices store a network address permanently assigned to that device in a PROM (programmable read only memory). The contents of the PROM are read by the host computer for use during network communications, and are also used by the communication board to determine which network packets to receive and which to ignore. In the present invention, the Ethernet network address is stored in serial EEPROM 58, which consumes approximately 0.1% as much power as a comparable PROM. Thus the present invention reduces the amount of power consumed by network communication peripheral devices.

The Ethernet network address is stored in each communication board's EEPROM at the time of manufacture, and the communication board's microcontroller 46 is programmed to prevent the host computer from changing or overwriting the Ethernet network address. Furthermore, also stored in the EEPROM at the time of manufacture are (A) a board type value, (B) a checksum value (to validate the Ethernet ID and board type value), and (C) default values for Configuration Registers A, B and C. Network communication software provided with the communication board for execution by the host computer verifies the checksum, during shared memory mode operation of the host computer, to ensure the integrity of the network address stored in the EEPROM. Bits 0–2 of the configuration Register A value in the EEPROM may be an I/O Address Code of "001", which causes the peripheral device 44 to initially have no assigned I/O base address, or it may be an Address Code representing a particular default I/O base address such as 0300H.

A serial/parallel interface 60 enables loading data from the microcontroller 46 into the EEPROM 58, as well as reading data from the EEPROM 58 into a register bank 62. The use of such serial/parallel interfaces in conjunction with serial EEPROM devices is well known to those skilled in the art. When configuration values are to be stored in the EEPROM 58, the serial/parallel interface 60 converts data from parallel format into a serial stream of bits, along with the control signals needed to store those bits in the EEPROM 58 at the appropriate address. When configuration values are read from the EEPROM 58, the serial/parallel interface 60 converts the serial stream of bits output by the EEPROM 58 into parallel format, and then latches the configuration values into pre-assigned registers in the register bank 62. As will be described below, register bank 62 includes a number of configuration registers 64, 66, 68 that store a corresponding number of configuration bytes (Config A, Config B, Config C).

The peripheral device 44 of FIG. 1 also includes optional jumpers 70, which may be used in lieu of the automatic configuration apparatus and method to be described. As will be described in more detail below, the jumpers 70 can be used to set the peripheral device's I/O address and interrupt code, and to prevent those configuration values from being set by software executed by the host computer 22.

Having provided an overview of the elements of the invention, attention turns to a more detailed discussion of the method and apparatus of the invention. Memory 26 of host computer 22 includes a table of configuration information 28. In the preferred embodiment, a configuration setup program 29 executed by the host computer 22 provides a set of default configuration values for all parameters except the I/O address and interrupt code, and allows the user to change the default configuration values via the user interface 25. The configuration setup program 29 also calls a subroutine 30 for identifying an available I/O address, not used by any of the other peripheral devices 38, 40, 42. Once all the configuration parameters for the peripheral device have been set, the configuration setup program 29 packs the configuration parameters into the format needed by the peripheral device 44, and then calls the programs 32 and 34 used to download those configuration parameters into the peripheral device. By way of example, Table 1 shows the three bytes of configuration information used for configuring a network communication board.

As shown in Table 1, the first three bits of Configuration Register A are used to store a code corresponding to the I/O address assigned to the peripheral device 44. For example, a bit sequence of "101" corresponds to an assigned I/O address of "0320H$_{Hex}$". Similarly, the next three bits of Configuration Register A are used to assign an interrupt code to the peripheral device. All the other information in the configuration registers, excepting bit 7 of configuration register B and bit 7 of configuration register C, concern aspects of the peripheral device not relevant to the present invention.

TABLE 1

| Configuration Register A | | |
|---|---|---|
| | Function | |
| | I/O Address Assignment: | |
| Bit Number(s) | Bits | I/O Address |
| 0–2 | 000 | 0300H |
| | 001 | No I/O Address |
| | 010 | 0240H |
| | 011 | 0280H |
| | 100 | 02C0H |
| | 101 | 0320H |
| | 110 | 0340H |
| | 111 | 0360H |
| 3–5 | Interrupt Code Assignment | |
| 6 | Fast Read (before current read completed) | |
| 7 | Shared Memory Mode or I/O Mode | |

| Configuration Register B | |
|---|---|
| Bit Number(s) | Function |
| 0–1 | Network Physical Interface Type |
| 2 | Link Test Disable |
| 3 | Read/Write Indicator |
| 4 | Command Strobe Indicator |
| 5 | Bus Error Signal |
| 6 | PROM Write |
| 7 | EEPROM Load |

| Configuration Register C | |
|---|---|
| Bit Number(s) | Function |
| 0–3 | Address at which PROM begins |
| 4 | Compatibility with Network Board |
| 5 | Interrupt Mode |
| 6 | Clock Select |
| 7 | Software Configuration Enable for Registers A and B |

Figure 3:
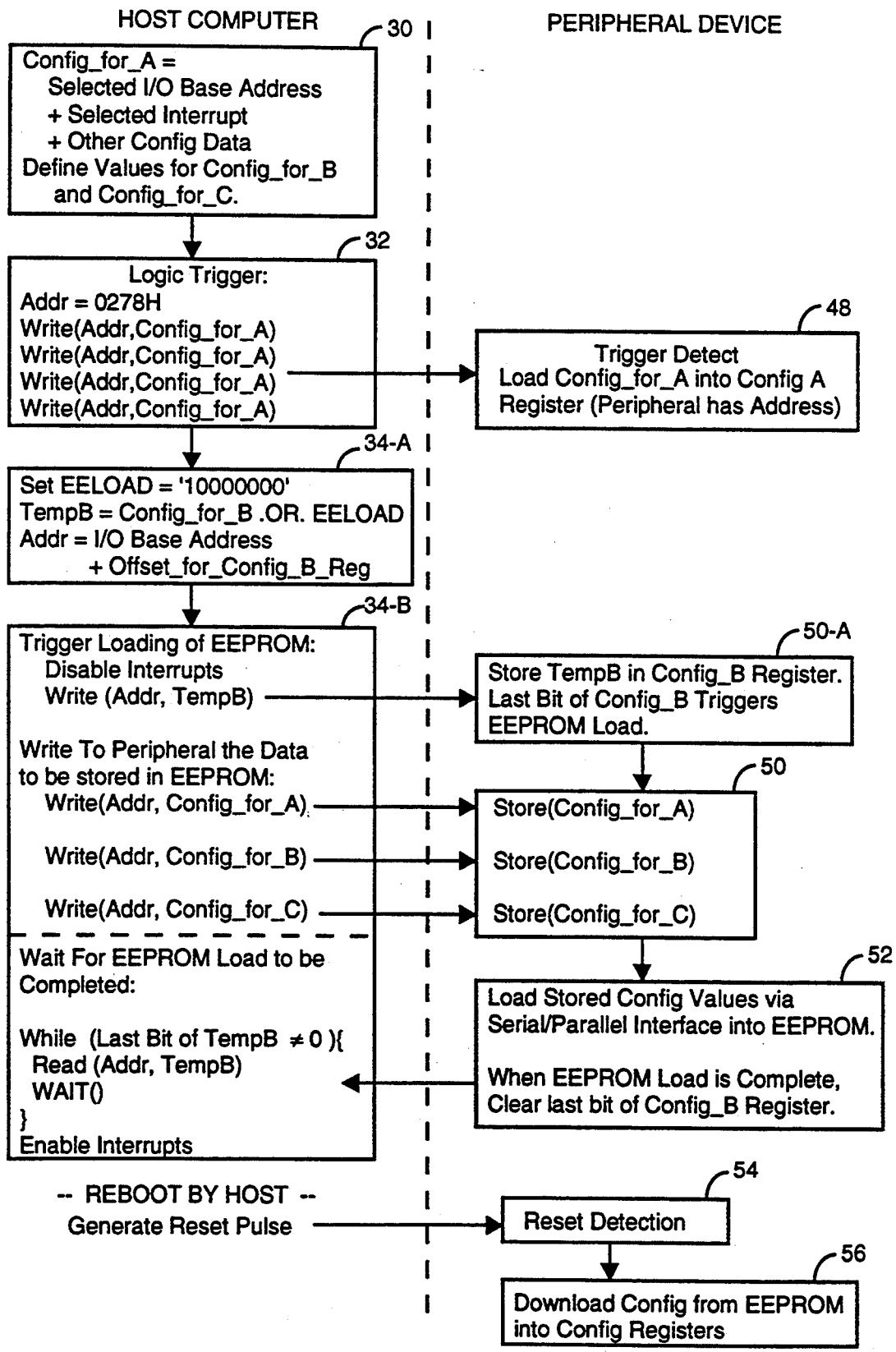
FIG. 3 is a detailed depiction of the steps associated with the automatic configuration of a computer peripheral in accordance with the invention.

Referring to FIG. 3, the address identification subroutine 30, identifies an available I/O address, not used by any of the other peripheral devices (38, 40, 42), as follows. In general, a host computer 22 such an IBM PC/AT (a trademark of International Business Machine Corporation) will have a predefined set of "I/O base addresses" that can be assigned to peripheral devices. Once an I/O base address has been assigned to a particular device, all the address values between the assigned I/O base address and some offset from there, will be used solely for communications between the host computer and that peripheral device. For instance, if a peripheral device is assigned an I/O base address of 0300H, then all address values between 0300H and 031FH (a set of 32 address values) will be used solely for communication between the host computer and that peripheral device. Furthermore, it is generally the case that the host computer can determine if a peripheral device has been assigned an I/O base address simply by executing a Read Command using the I/O base address. For instance, in IBM PC/AT systems, if an I/O base address is not assigned to any peripheral, then all 32 bytes of the associated I/O base address range should be equal to 0FFH when read by the host CPU.

Thus, to find an available I/O base address, the address identification subroutine 30, sequentially performs a Read Command on successive ones of the predefined set of "I/O base address ranges" that can be assigned to peripheral devices, until it finds an I/O base address range that has not yet been assigned to a peripheral device. More specifically, in the preferred embodiment the host computer reads all 32 bytes in each potential base address range until it finds a 32-byte base address range in which every byte is equal to the designated value of 0FFH. It then assigns that I/O base address range to peripheral device 44, and stores the corresponding three bit code in the configuration table 28.

As will understood by those skilled in the art, the address identification subroutine 30 selects an interrupt code for the peripheral device 28 by inspecting the host computer's interrupt vector table (not shown), and selecting an interrupt code not yet assigned to any other peripheral device. The corresponding three-bit code is then stored in configuration table 28.

Next, the configuration setup program 29 calls logic trigger subroutine 32 to initiate the process of downloading the configuration information in table 28 into the peripheral device. It bears noting that, at this point in time, the peripheral device 44 has no assigned I/O base address, and thus cannot be sent any information in the normal manner. Instead, a special sequence of signals herein called a "logic trigger" is transmitted by the host computer over the system bus 36, and the peripheral device 44 monitors the system bus 36 so as to detect the logic trigger.

Block 32 in FIG. 3 shows a routine for generating a logic trigger which may be used in accordance with the invention. Data for Configuration Register A is written onto bus 36 at an infrequently used location. For example, when the host computer is an IBM PC/AT or compatible computer, the address location 0278H in the I/O space is the address location assigned to the secondary printer's data port, and therefore that address is not commonly used. Since printing data also requires writing to a register adjacent to the printer's data port, software can guarantee that data to be printed via this port is not corrupted by the peripheral configuration process of the present invention. As indicated in FIG. 3, the configuration information for register A is written to this location four times, without interruption, thereby generating the logic trigger signal.

Figures 4, 5:
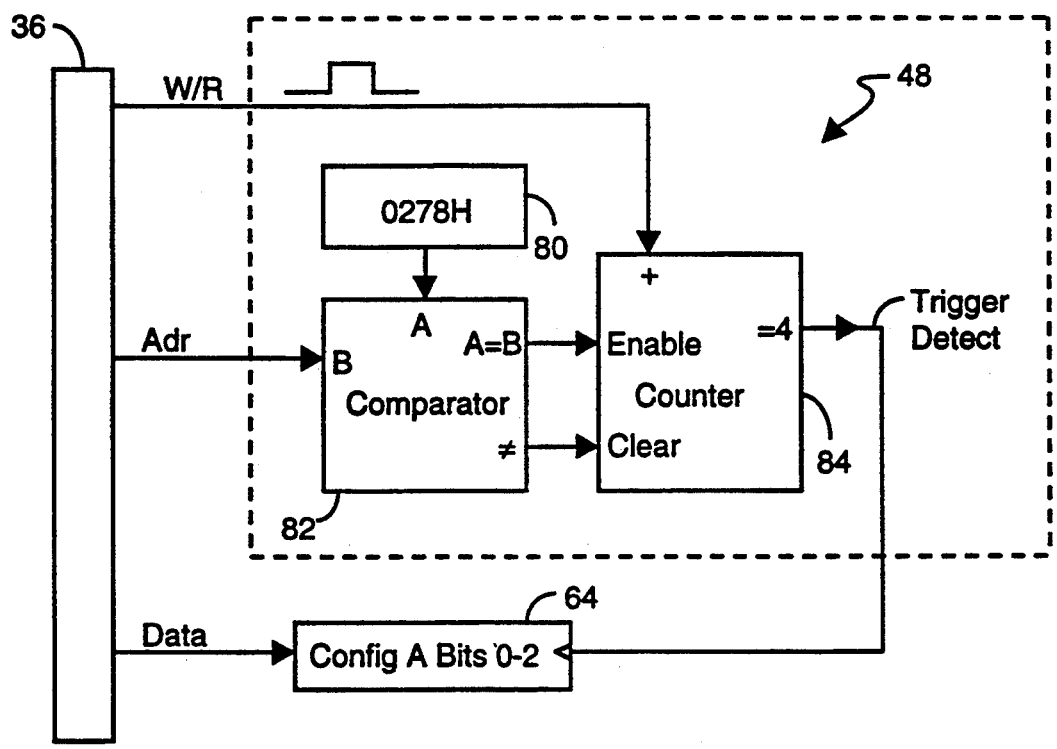
FIG. 4 is a trigger detector which may be used in accordance with the invention.
FIG. 5 depicts a memory map for an EEPROM which may be used in accordance with the invention.

Referring to FIG. 4, the microcontroller 46 in the peripheral device includes a special trigger detector circuit 48 (or equivalent software) that detects the occurrence of four consecutive writes to address 0278H. In particular, a register 80 stores the trigger address 0278H, a comparator 82 outputs an Enable signal when the address on the system bus equals 0278H, and otherwise outputs a Clear signal. Counter 84 is reset to zero whenever the comparator 82 outputs a Clear signal, and increments an internally stored value by one whenever a write pulse is generated on the Write/Read line of system bus 36 and comparator 82 outputs an Enable signal. Thus, the transmission of an address value over the system bus 36 other than 0278H causes the counter 84 to be cleared. The trigger signal address, 0278H, is selected such that during normal operation of the host computer, four consecutive writes to that address would be meaningless and contrary to normal system specifications, thereby virtually guaranteeing that this sequence of signals will be used only by the logic trigger program.

Upon the fourth consecutive write to address 0278H, the counter 84 outputs a Trigger Detect signal, which causes the data on the data lines of the system bus 36 to be loaded into bits 0–2 of Configuration Register A. After Configuration Register A has been loaded, the peripheral device 44 adopts the I/O base address defined by bits 0–2 in the register, and the peripheral device 44 thereafter responds to commands directed at addresses within its assigned address space. Since the assigned I/O base address was selected by the host computer so as to not conflict with the I/O base address of any other peripheral device in the computer system 20, the peripheral device 44 now has a non-conflicting I/O base address that enables communication between the host computer 22 and the peripheral device 44.

Once the identified I/O address has been stored in the peripheral device's configuration register, the peripheral device can thereafter be accessed by the host computer using commands directed at that I/O address or at an associated range of I/O addresses. For instance, at this point in time other configuration parameters could be written by the host into the Configuration Registers A, B and C.

Still referring to FIG. 3, after assigning the peripheral device 44 an I/O base address, the configuration setup program 29 executed by the host computer next calls a configuration information transfer program 34. The purpose of the configuration information transfer program 34 is to download a full set of configuration parameters into the peripheral device's EEPROM 58.

As indicated in Table 1, above, setting the last (or most significant) bit of Configuration Register B to a value of "1" initiates a special routine 56 in the peripheral device 44 for loading three bytes of configuration parameters into EEPROM 58. This last bit of Configuration Register B is herein called the EELOAD bit.

As indicated in block 34-A of FIG. 3, the information transfer program modifies the previously selected Configuration B value, stored in table 28, by setting its last bit to "1", and storing the resulting value in a variable called TempB. This is accomplished by logically ORing Configuration B byte with a value of "1000 0000". To load the modified Configuration B byte into Configuration Register B in the peripheral device, an address is defined by adding an offset associated with Configuration Register B to the I/O base address previously assigned to the peripheral device.

With the proper address and configuration data values established, the information transfer step (block 34-B) is initiated. In particular, the host computer performs a Write Command that transmits the temporary byte value TempB onto the data lines of the system bus 36 while transmitting the computed address value on the system bus and a write pulse on the Write/Read control line of the system bus. The peripheral device 44 receives the transmitted TempB value, because it was "written" by the host computer to an address location within the address space assigned to the peripheral device, and the peripheral device then stores the TempB value in Configuration Register B (block 50-A). Once the TempB value is stored in Configuration Register B 66, the microcontroller 46 recognizes that the EELOAD bit is set. As a result, the microcontroller 46 prepares to receive a sequence of configuration values transmitted by the host computer.

Next, as indicated in FIG. 3, the host computer performs an information transfer step (block 34-B) that transmits the configuration register values (Config_for_A, Config_for_B, and Config_for_C) to the peripheral device 44, which temporarily stores the received values in a buffer within the microcontroller 46. Interrupts are disabled in the host computer during this process to prevent the transmission of the configuration register values from being disrupted by any other accesses to the peripheral device.

Upon receiving the third configuration value, the peripheral device invokes its EEPROM memory write routine (block 52) which stores the three received values in a set of three predefined locations in the EEPROM 58 via the serial/parallel device 60. The process of storing the three configuration values in EEPROM is relatively slow, and the host computer must be prevented from accessing the peripheral device until the process is complete. To this end, when the EEPROM loading process is completed, the microcontroller 46 automatically resets the last bit of Configuration Register B to ZERO. Furthermore, the host computer 22 monitors the value of the last bit of Configuration Register B by executing a "While" loop, as indicated in FIG. 3 (block 34B), during which it repeatedly reads the value of Configuration Register B until it detects that the EEPROM load bit has been reset, terminating the "While" loop.

FIG. 5 depicts the EEPROM memory map for a preferred embodiment of an Ethernet network board. The configuration information is loaded at the higher addresses of the EEPROM. The EEPROM also stores a checksum for verifying a proper data transfer, information on the board type, and a six-byte Ethernet network address.

Once the configuration information is loaded into the EEPROM 58, as previously described, the configuration may be downloaded directly from the EEPROM 58, with the downloading process be initiated by rebooting the host computer. Alternately, to avoid the need for rebooting the host computer after storing configuration information in the EEPROM, the same configuration information may be written directly by the host computer into the peripheral device's Configuration Registers A and B by writing the configuration values to addresses at predefined offsets from the selected base I/O address. In the preferred embodiment, Configuration Register C is always configured from the EEPROM during a reset and cannot be directly accessed by the host computer.

The reboot process is illustrated at the bottom of FIG. 3. Each time the host computer reboots, typically when the host computer is powered on or otherwise reset, the host computer generates a reset pulse signal having a duration of at least 1 millisecond. The microcontroller 46 in the peripheral device 44 includes either a reset detection circuit or an equivalent reset detection routine 54. The reset detection circuit or routine (block 54) measures the time that the RESET line is active. After a predetermined time, for instance 515 microseconds, the active line is considered a valid power on reset. After a valid power on reset signal (Reset Detection) goes low, the microcontroller's memory download routine sends signals to the EEPROM 58, via the serial/parallel interface 60, that read the three bytes of configuration information from the EEPROM 58 and stores those into the Configuration Registers 64, 66 and 68.

Thus, instead of having to repeatedly configure a peripheral, the present invention detects the resetting of a host computer. In response to the reset detection, the previously stored EEPROM configuration information is downloaded into a register bank associated with the microcontroller.

Figure 6:
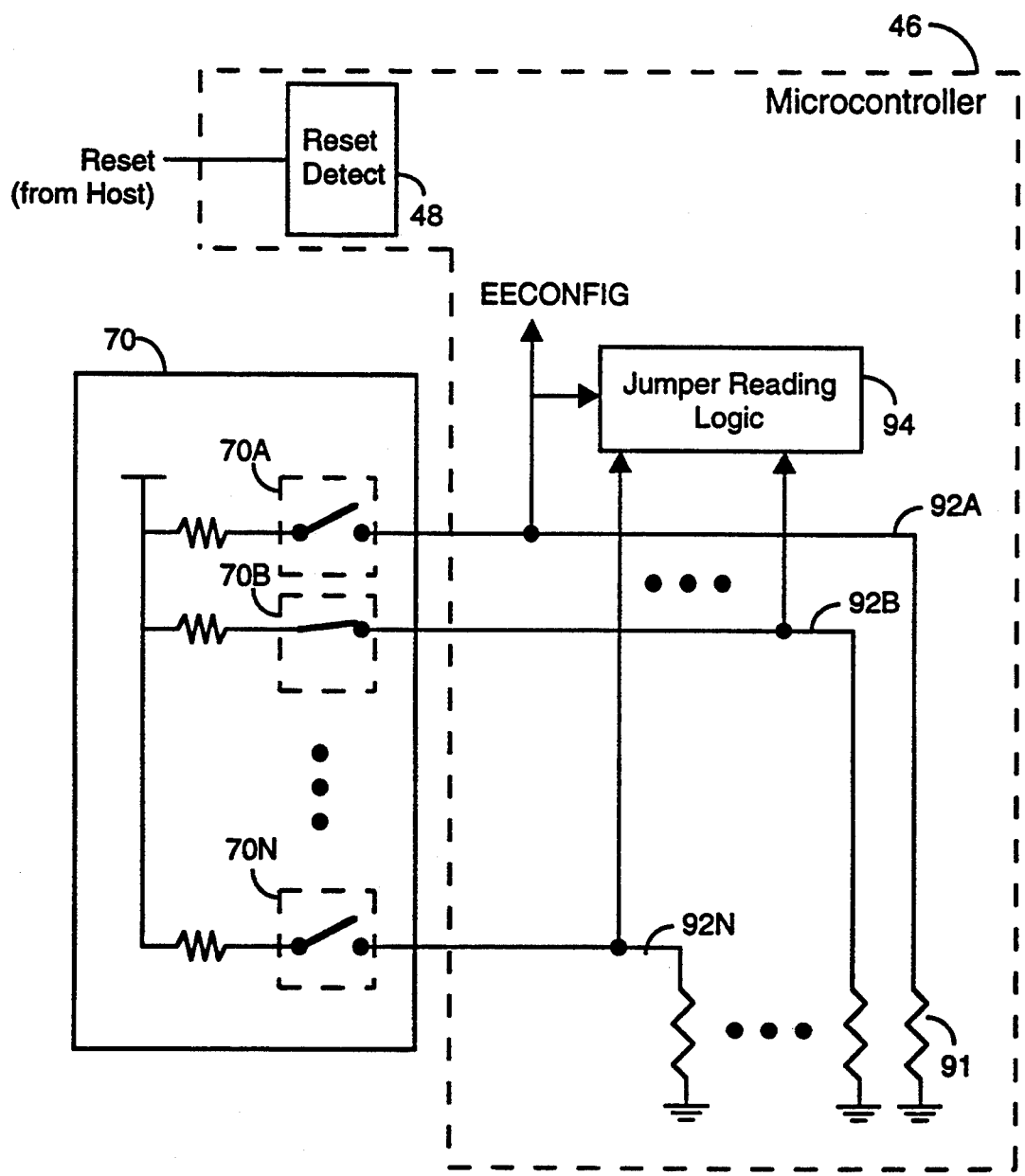
FIG. 6 depicts prior art jumpers used in conjunction with the microcontroller of the invention.

Referring to FIGS. 1 and 6, the present invention is also operable with traditional jumpers 70 or an equivalent set of switches. When jumpers 70 are not used, all the input/output nodes 92 (except the EECONFIG node 92A discussed next) associated with the jumpers are tied to the common ground node. One input node of the peripheral device, for instance node 92A, also labelled "EECONFIG" in FIG. 6, is read by the microcontroller upon detection of a reset signal. If the EECONFIG node 92A is at a High voltage potential, then the configuration values in the EEPROM 58 are downloaded into Configuration Registers A, B and C. However, when the EECONFIG node 92A is at a Low voltage potential, then the configuration values for the peripheral device are obtained by reading, upon reset detection, the values on all the input nodes associated with the jumpers 70B-70N and loading those values into Configuration Registers A, B and C. In the latter case, data from the EEPROM 58 is not loaded into Configuration Registers A, B and C.

As indicated in FIG. 6, the optional jumper devices 70A, 70B, through 70N can each be set or manipulated so as to present high or low voltage potentials, corresponding to "1" and "0" logic values, on input nodes 92A to 92N. Upon reset detection, if node 92A is at a low voltage potential, a logic circuit 94 reads the logic values represented by the jumper input nodes 92B-92N and the microcontroller 46 loads those values into Configuration Registers A, B and C.

Preferably, pull-down resistors 91 are provided in the microcontroller 46 for all the jumper device nodes 92A-92N, so that if any of these nodes are left unconnected, they default to a logic zero. These resistors preferably have a high resistance, such as 50K ohms, to limit the amount of current used.

One skilled in the art will recognize a number of benefits associated with the present invention. In particular, the invention provides a method and apparatus for automatically configuring a computer peripheral. In other words, the user of the computer is not required to identify an available I/O address space for the peripheral to be installed. The invention automatically identifies an unused peripheral I/O address (Address Identification 30). In addition, by storing the peripheral device's configuration information in non-volatile storage incorporated in the peripheral device, the host computer need not load the configuration information into the peripheral device every time the host computer is booted up.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of automatically configuring a peripheral device connected to a host computer, comprising:
   identifying an available address for the peripheral device;
   transmitting a signal containing the available address to an infrequently used I/O address accessible by the host computer;
   detecting the signal transmitted to the infrequently used I/O address by means of a detection circuit in the peripheral device;
   assigning the available address to the peripheral device in response to detection of the transmitted signal;
   transferring additional configuration data to the peripheral device by accessing the peripheral device using the address assigned to the device; and
   storing the address and the additional configuration data in a non-volatile memory contained in the peripheral device.

2. The method of claim 1, wherein the step of transmitting a signal containing the available address to an infrequently used I/O address further comprises:
   performing a sequence of write commands to write the available address to the infrequently used I/O address.

3. The method of claim 2, wherein the infrequently used I/O address is the address assigned to a secondary printer data port on the host computer.

4. The method of claim 1, further comprising the step of:
   reading the address and the additional configuration data for the peripheral device from the non-volatile memory located on the device when the host computer resets.

5. The method of claim 4, wherein the non-volatile memory contained in the peripheral device is an EEPROM.

6. The method of claim 1, wherein the step of identifying an available address for the peripheral device further comprises:
   executing a read command using a possible address;
   determining if the possible address is used by determining if a peripheral device connected to the host computer responds to the read command;
   if the possible address is being used, continuing the step of executing a read command using different possible addresses until an unused address is found; and
   identifying the unused address as an available address.

7. The method of claim 1, further comprising the step of:
   disabling a downloading of configuration data from the non-volatile memory to the peripheral when the host computer is booted; and
   reading the address for the peripheral device and additional configuration data for that device from jumpers or switches on the peripheral device.

8. An automatically configuring computer system, comprising:
   a host computer, said host computer including
      means for identifying an available address to assign to a peripheral device;
      means for transmitting a signal containing the available address to an infrequently used I/O address accessible by the host computer; and
   a peripheral device connected to the host computer, said peripheral device including
      means for detecting the transmitted signal;
      means for loading the available address into the peripheral device upon detection of the transmitted signal, thereby assigning that address to the peripheral device;
      means for receiving configuration data transmitted by the host computer to the assigned address; and
      non-volatile storage means for storing the assigned address and the configuration data transmitted to the peripheral device.

9. The computer system of claim 8, wherein the means for identifying an available address to assign to a peripheral device executes a read command using a possible address to determine if a peripheral device connected to the host computer responds to that command, and further, wherein the read command is executed using different possible addresses until an unused address is found, the unused address being identified as an available address.

10. The computer system of claim 8, wherein the means for transmitting a signal containing the available address to an infrequently used I/O address transmits a sequence of write commands to write the available address to the infrequently used I/O address.

11. The computer system, of claim 10, wherein the infrequently used address is the address assigned to a secondary printer data port on the host computer.

12. The computer system, of claim 8, further comprising:
   means for disabling a downloading of configuration data from the non-volatile memory when the host computer is booted;
   means for a user to assign configuration data for the peripheral device; and
   means for reading the user assigned configuration data for the peripheral device.

13. The computer system of claim 8, wherein the non-volatile memory is an EEPROM.

* * * * *